(12) United States Patent
Ito

(10) Patent No.: US 9,353,807 B2
(45) Date of Patent: May 31, 2016

(54) STARTING CLUTCH CONTROL SYSTEM FOR VEHICLES

(75) Inventor: Yoshio Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/375,242

(22) PCT Filed: Apr. 6, 2012

(86) PCT No.: PCT/JP2012/059499
§ 371 (c)(1),
(2), (4) Date: Jul. 29, 2014

(87) PCT Pub. No.: WO2013/150641
PCT Pub. Date: Oct. 10, 2013

(65) Prior Publication Data
US 2015/0133267 A1  May 14, 2015

(51) Int. Cl.
*B60W 10/02* (2006.01)
*B60W 30/18* (2012.01)
*F16D 48/06* (2006.01)

(52) U.S. Cl.
CPC ............ *F16D 48/066* (2013.01); *F16D 48/06* (2013.01); *B60W 30/18018* (2013.01); *F16D 2500/1026* (2013.01); *F16D 2500/1045* (2013.01); *F16D 2500/1064* (2013.01); *F16D 2500/1068* (2013.01); *F16D 2500/10412* (2013.01); *F16D 2500/1107* (2013.01); *F16D 2500/3061* (2013.01); *F16D 2500/3067* (2013.01); *F16D 2500/3069* (2013.01); *F16D 2500/30421* (2013.01); *F16D 2500/5043* (2013.01); *F16D 2500/50224* (2013.01); *F16D 2500/50287* (2013.01); *F16D 2500/50833* (2013.01); *F16D 2500/50883* (2013.01); *F16D 2500/7041* (2013.01); *F16D 2500/70408* (2013.01); *Y10T 477/735* (2015.01)

(58) Field of Classification Search
CPC ............... F16D 2500/5043; F16D 2500/3061; F16D 2500/1107; F16D 2500/70428; B60W 2050/004; B60W 2050/0041
See application file for complete search history.

(56) References Cited

U.S. PATENT DOCUMENTS

| | | | |
|---|---|---|---|
| 2003/0017912 A1 * | 1/2003 | Shimabukuro et al. | 477/115 |
| 2005/0177295 A1 * | 8/2005 | Rodrigues et al. | 701/67 |

FOREIGN PATENT DOCUMENTS

| | | |
|---|---|---|
| JP | A-11-325232 | 11/1999 |
| JP | A-2005-291174 | 10/2005 |

* cited by examiner

*Primary Examiner* — Mark Manley
(74) *Attorney, Agent, or Firm* — Oliff PLC

(57) ABSTRACT

According to the present invention, a starting clutch control system is configured to stop the engine while disengaging the clutch upon satisfaction of a predetermined condition when the vehicle is running, and restart the stopping engine while engaging the clutch upon satisfaction of a predetermined restarting condition. The starting clutch control system applied to a vehicle is configured: to estimate a turbine torque of the torque converter based on engine speed, and capacity coefficient and a torque ratio of the torque converter, when the engine is required to increase a power to be restarted; to increase a torque transmitting capacity of the clutch in accordance with the estimated turbine torque; to estimate the turbine torque based on an air intake of the engine and an engine speed after a completion of an engagement of the clutch; and control the torque transmitting capacity of the clutch with the estimated turbine torque.

7 Claims, 8 Drawing Sheets

STARTING CLUTCH CONTROL SYSTEM FOR VEHICLES

TECHNICAL FIELD

The present invention relates to a system for controlling a starting clutch for connecting a prime mover such as an engine with a transmission mechanism, and more particularly, to a system for controlling a torque transmitting capacity of the starting clutch responsive to a torque inputted through a torque converter.

BACKGROUND ART

A required drive force is changed while a vehicle is running, and an energy efficiency of a prime mover is deteriorated if the prime mover is operated at an operating point (or a driving point) away from a predetermined optimum operating point. Therefore, a transmission is arranged on an output side of the prime mover, and a drive force is adjusted in accordance with a speed ratio while controlling a rotational speed of the prime mover in an optimally energy efficient manner. In general, an automatic geared transmission adapted to change a speed ratio stepwise and a continuously variable transmission adapted to change a speed ratio continuously are used in vehicles. In the vehicle having this kind of transmission, a torque converter is disposed between the engine and the transmission to keep the engine driving in a stopping vehicle.

As known in the conventional art, the torque converter is adapted to transmit a torque by rotating a turbine by a spiral oil flow created by a pump impeller. In the torque converter, the torque is amplified by altering a direction of the oil flow returning to the pump impeller by a reaction force of a stator under the condition that a speed difference between the pump impeller and the turbine is large (i.e., if a speed ratio is small). Accordingly, a creep torque is generated under the condition that the speed ratio is small. Nonetheless, the torque applied to the transmission connected to an output side of the torque converter is changed responsive to the speed ratio of the torque converter. Therefore, as described in Japanese Patent Laid-Open No. 11-325232, an oil pressure applied to engagement elements of the transmission such as a clutch and a brake is controlled to control a torque transmitting capacity thereof in accordance with a condition of the torque converter.

The control system taught by Patent Laid-Open No. 11-325232 is applied to a vehicle in which an automatic geared transmission is connected to an output side of an internal combustion engine to control hydraulic pressure applied to a clutch of the transmission. In the vehicle of this kind, an engine torque starts to be changed after a lag behind an accelerating operation, and a delay in hydraulic response is also caused. Therefore, a hydraulic pressure applied to the clutch may be changed after a lag behind an increase in a turbine torque of the torque converter interposed between the engine and the transmission. In order to solve such disadvantage, according to the teachings of Japanese Patent Laid-Open No. 11-325232, an engine torque is calculated based on parameters representing an engine load such as an opening degree of an accelerator and an air-intake, and an engine speed, and an input torque of the clutch is calculated based on the calculated engine torque and the engine speed. That is, the engine torque is changed in accordance with the engine speed and a physical amount of the air-intake. Therefore, the engine torque is calculated first of all based on the parameters representing the engine load and the engine speed. A turbine torque of the torque converter can be calculated based on an input torque, a capacity coefficient, a speed ratio and so on. Therefore, a clutch torque corresponding to the turbine torque is then calculated based on the engine torque corresponding to the input torque and the engine speed corresponding to the input speed. A torque transmitting capacity of the clutch is increased with an increase in the hydraulic pressure. Therefore, if the input torque is known, the hydraulic pressure can be calculated based on the input torque.

In turn, Japanese Patent Laid-Open No. 2005-291174 describes a torque control device configured to estimate an engine torque. According to the teachings of Japanese Patent Laid-Open No. 2005-291174, the estimation torque is calculated using a torque converter characteristic defined based on a relation between an input shaft speed and an output shaft speed. Specifically, the estimation torque is calculated by multiplying a coefficient of capacity of a torque converter by a speed ratio and a square of the input speed, and by adding inertia torques of an engine and the torque converter and a loss torque of an auxiliary to the product. In addition, according to the teachings of Japanese Patent Laid-Open No. 2005-291174, an engine torque characteristic is learnt by comparing the estimation torque using the torque converter characteristic with the estimation torque based on an air quantity, and such learning of the engine torque characteristic is inhibited provided that a predetermined condition is satisfied. For example, the learning of the engine torque characteristic is inhibited if a change rate of an input speed or an output speed is large.

Thus, according to the teachings of Japanese Patent Laid-Open No. 11-325232, the parameters representing the engine load can be detected in short time so that the above-explained time lag can be ignored. Therefore, the hydraulic pressure applied to the clutch can be controlled without delay. However, the control taught by Japanese Patent Laid-Open No. 11-325232 is carried out utilizing a predetermined relation between the parameter such as a throttle opening or an air intake and an output torque. That is, the control delay of the clutch can be eliminated by the control system taught by Japanese Patent Laid-Open No. 11-325232, however, the pressure would be applied to the clutch excessively or insufficiently if the engine torque or the input torque of the clutch cannot be detected accurately. In the conventional vehicle, so-called "stop and start" control may be executed optionally to improve fuel economy upon satisfaction of a predetermined condition. According to the stop and start control, specifically, the engine is stopped when the accelerator is closed completely, and the engine is restarted when such condition is eliminated. To this end, the torque converter is disconnected from the transmission by disengaging the clutch during stopping the engine, and the clutch is engaged when the engine is restarted. During restarting the engine, a combustion state in the engine is unstable until a complete explosion of fuel is achieved, therefore, an air fuel-ratio is controlled to be richer than that under the situation in which the engine rotates autonomously. That is, the relation between the throttle opening or an air intake and the output torque is deviated from the predetermined relation. Therefore, the response delay can be eliminated by the control system taught by Japanese Patent Laid-Open No. 11-325232 but the hydraulic pressure applied to the clutch cannot be controlled appropriately with respect to the input torque. For this reason, shocks of the clutch may be caused and an excessive slippage may be caused thereby damaging the clutch.

As described, the torque control device taught by Japanese Patent Laid-Open No. 2005-291174 is configured to learn and inhibit the engine torque characteristic depending on a situation. To this end, the engine torque characteristic is estimated based on the characteristic of the torque converter, however, the estimated value will not be reflected as an actual torque on the control. As described, the torque thus estimated using the torque converter characteristic is compared with the estimated torque based on an air quantity. However, the relation between the estimated torque and the engine load differs under the condition that the engine is operated unstably during restarting. In this case, therefore, the engine torque cannot be estimated accurately and the control taught by Japanese Patent Laid-Open No. 2005-291174 cannot be carried out.

DISCLOSURE OF THE INVENTION

The present invention has been conceived noting the foregoing technical problems, and it is an object of the present invention is to provide a starting clutch control system for a vehicle, which is configured to adjust hydraulic pressure governing a torque transmitting capacity of the clutch to an engine torque applied to the clutch in the event of starting an engine while engaging the clutch.

The starting clutch control system is applied to a vehicle in which a torque generated by an engine is inputted to a torque converter comprised of a pump impeller and a turbine, and the torque is outputted from the torque converter to driving wheels through a starting clutch. Basically, the starting clutch control system is configured to stop the engine while disengaging the starting clutch upon satisfaction of a predetermined condition when the vehicle is running, and to restart the stopping engine while engaging the starting clutch upon satisfaction of a predetermined restarting condition. In order to achieve the above-explained object, according to the present invention, the starting clutch control system is configured: to estimate a torque of a turbine of the torque converter based on an engine speed, and a capacity coefficient and a torque ratio of the torque converter, when the engine is required to increase a power to be restarted; to increase a torque transmitting capacity of the clutch in accordance with the estimated torque of the turbine; to estimate the torque of the turbine based on an air intake of the engine and an engine speed after a completion of an engagement of the clutch; and to control the torque transmitting capacity of the clutch in accordance with the estimated torque of the turbine.

In addition, the starting clutch control system is further configured to control the torque transmitting capacity of the clutch in accordance with the torque of the turbine estimated based on the air intake of the engine and the engine speed instead of the torque of the turbine estimated based on the engine speed, and the capacity coefficient and the torque ratio of the torque converter, if a demand to increase the engine power is eliminated during increasing the torque transmitting capacity of the clutch.

Specifically, the torque of the turbine to be used to control the torque transmitting capacity of the clutch is switched from the torque of the turbine estimated based on the engine speed, and the capacity coefficient and the torque ratio of the torque converter, to the torque of the turbine estimated based on the an air intake of the engine and the engine speed, if a difference between those estimated torques is smaller than a predetermined value.

For example, a friction clutch whose torque transmitting capacity is increased by increasing hydraulic pressure applied thereto is used as the clutch. According to the present invention, the hydraulic pressure applied to the friction clutch is corrected in accordance with an opening degree of a throttle valve of the vehicle or a speed ratio of the clutch.

Specifically, the hydraulic pressure applied to the friction clutch is corrected to be lowered in case the opening degree of the throttle valve or the speed ratio is large, in comparison with a case in which the opening degree of the throttle valve or the speed ratio is small.

According to the present invention, specifically, an internal combustion engine is employed as the engine. In addition, the starting clutch control system is further configured to estimate the torque of the turbine of the torque converter based on the engine speed, and the capacity coefficient and the torque ratio of the torque converter, after a complete explosion of fuel is achieved in the restarted engine, and to increase the torque transmitting capacity of the clutch in accordance with the estimated torque of the turbine.

Specifically, the demand to increase the engine power is determined based on an augmentation of the opening degree of the accelerator or the throttle valve.

When restarting the engine, a relation between the air intake or the engine speed and the output torque is unstable, and therefore the engine torque cannot be estimated based on the air intake. However, according to the present invention, the torque applied to the clutch can be estimated accurately even under such situation. Therefore, the hydraulic pressure applied to the clutch or the torque transmitting capacity of the clutch can be adapted to the torque inputted to the clutch through the torque converter. For this reason, shocks resulting from an abrupt engagement of the clutch, and deterioration in the control response as well as durability of the clutch resulting from an excessive slippage can be avoided.

For example, if the accelerator pedal is returned abruptly during increasing the torque transmitting capacity of the clutch so that the demand to increase the engine power is eliminated, the starting clutch control system estimates the turbine torque based on the an air intake of the engine that is changed immediately responsive to a change in the demand to increase the engine power, and controls the torque transmitting capacity of the clutch in accordance with the turbine torque thus estimated. Therefore, a drive force will not be generated unintentionally under the situation where the demand to increase the engine power is eliminated, so that a period of so-called "free running" can be shortened.

According to the present invention, shocks and uncomfortable feeling can be reduced more certainly by switching the estimated value of the turbine torque used to calculate the torque transmitting capacity of the clutch from the value estimated based on the engine speed etc. to the value estimated based on the an air intake of the engine, under the condition where those estimated torques are close to each other.

In addition, a change in the drive force or the longitudinal acceleration can be mitigated to reduce the shocks as a cause of uncomfortable feeling, by correcting the hydraulic pressure applied to the clutch based on the opening degree of the throttle valve or the speed ratio of the clutch.

BEST MODE FOR CARRYING OUT THE INVENTION

Figure 8:
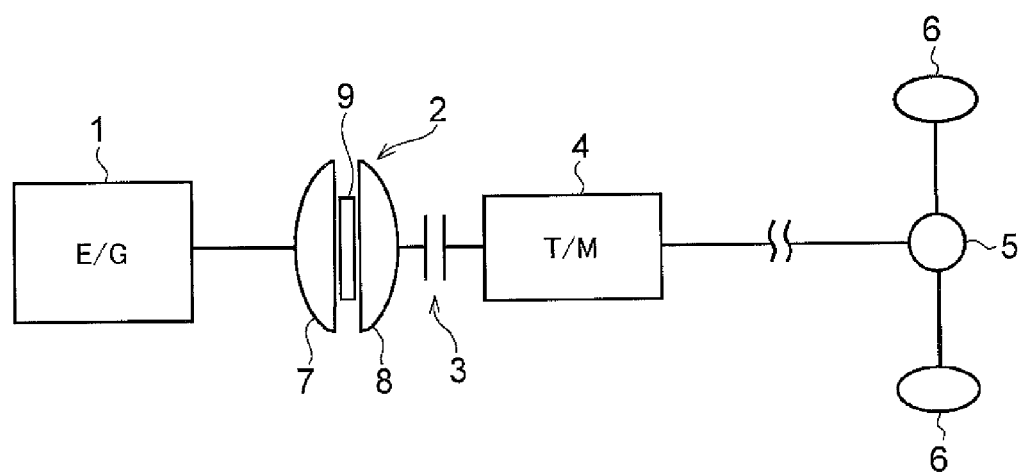
FIG. 8 is a view schematically showing a powertrain of the vehicle to which the present invention is applied.

Referring now to FIG. 8, there is shown a vehicle to which the present invention is applied. As shown in FIG. 8, the vehicle is comprised of an engine 1 (E/G), a torque converter 2, a starting clutch 3, and a transmission 4 (T/M). A torque of the transmission 4 is delivered to a pair of driving wheels 6 via a final reduction gear unit 5. The engine 1 is an internal combustion engine adapted to generate power by burning fuel such as a gasoline engine, a diesel engine, a gas engine and so on. In this preferred example, the gasoline engine is used as the engine 1, and an output torque of the engine 1 differs depending on an air intake. The engine 1 is provided with a not shown starter motor so that the engine 1 is allowed to be restarted even after stopped by stopping fuel supply.

As known in the conventional art, the torque converter 2 is comprised of a pump impeller 7 rotated by the engine 1, a turbine 8 rotated by receiving a spiral oil flow created by the pump impeller 7, and a stator 9 interposed between the pump impeller 7 and the turbine 8. Here, the stator 9 is fixed to a predetermined fixing portion through a one-way clutch (not shown). Accordingly, the torque converter 2 has an ability to multiply torque within a converter range so that torque applied to the starting clutch 3 is changed in accordance with a speed ratio or a torque ratio of the torque converter 2.

The starting clutch 3 is an engagement device adapted to selectively allow and interrupt torque transmission between the engine 1 and the transmission 4. To this end, for example, a friction clutch whose torque transmitting capacity can be changed, more preferably, a multiple disc clutch whose torque transmitting capacity is controlled hydraulically is used as the starting clutch 3. As to the transmission 4, not only an automatic geared transmission adapted to change a speed ratio stepwise but also a continuously variable transmission adapted to change a speed ratio continuously may be employed. The starting clutch 3 may be incorporated into the transmission 4.

The control system of the present invention is applied to the vehicle having a powertrain thus structured. In the vehicle, so-called "stop and start" control (abbreviated as "S & S control" hereinafter) is carried out to stop the engine 1 upon satisfaction of a predetermined execution condition, and to restart upon satisfaction of a predetermined restarting condition. The S & S control includes: "stop-based S & S control" for stopping the engine 1 based on a fact that vehicle is stopped; "deceleration-based S & S control" for stopping the engine 1 automatically based on a fact that the vehicle is decelerated to be stopped by depressing a brake pedal while returning an accelerator pedal; and "free run S & S control" for stopping the engine 1 automatically based on a fact that the accelerator pedal is returned at a vehicle speed higher than a predetermined speed. Specifically, the stop-based S & S control is executed based on a fact that the brake pedal is depressed in the stopping vehicle, and under the stop-based S & S control, the engine 1 is restarted by returning the brake pedal. Meanwhile, the deceleration-based S & S control is executed to stop the engine 1 based on a fact that the brake pedal is depressed while returning the accelerator pedal at a vehicle speed lower than a predetermined speed, and under the deceleration-based S & S control, the engine 1 is restarted by returning the brake pedal or depressing the accelerator pedal. In turn, the free run S & S control is executed to stop the engine 1 based on a fact that the accelerator pedal is returned at a vehicle speed higher than a predetermined speed.

Under the S & S control, the control system of the present invention interrupts a torque transmission between the engine 1 and the transmission 4 or the driving wheels 6 by disengaging the starting clutch 3 prior to stopping the engine 1. In addition, in the event of restarting the engine 1, the control system of the present invention increases a torque transmitting capacity of the starting clutch 3 with an increase in an output torque of the engine 1 to prevent a delay in starting the vehicle. Such control for engaging the starting clutch 3 carried out by the control system of the present invention will be explained hereinafter.

Figure 1:
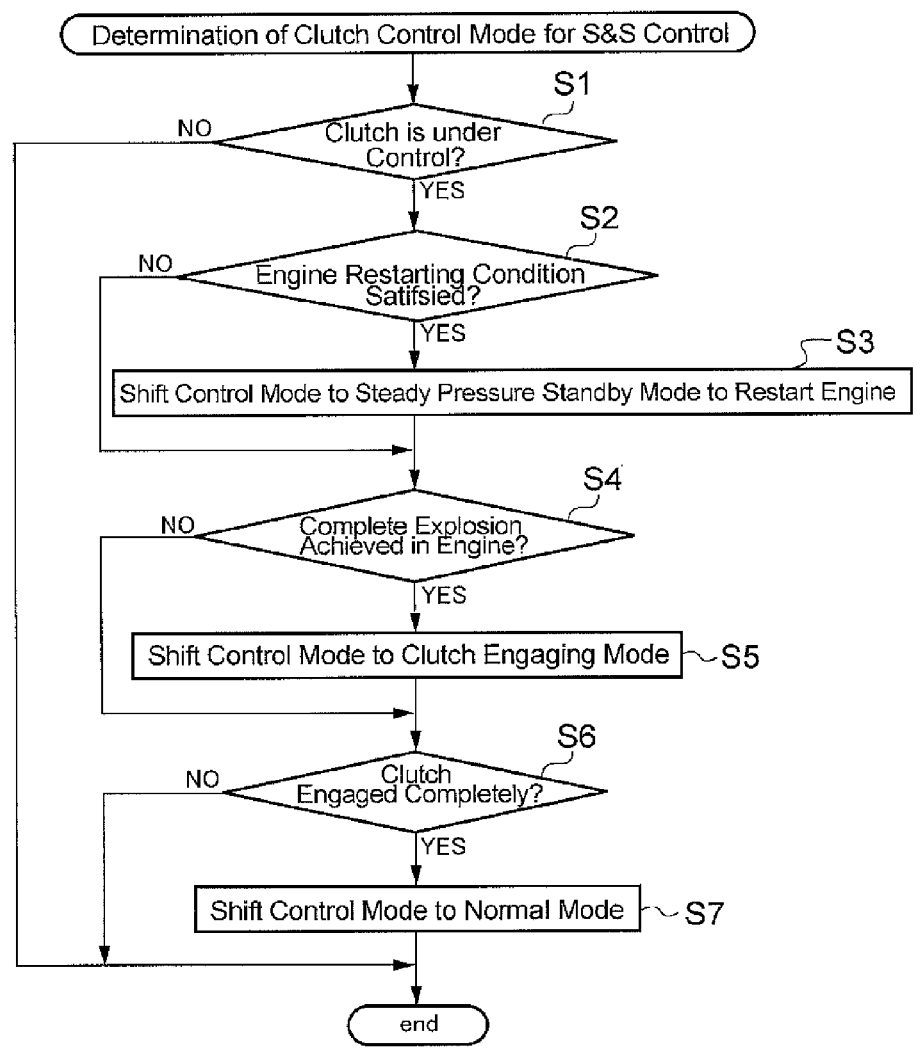
FIG. 1 is a flowchart showing one example of a control carried out by the starting clutch control system of the present invention.

FIG. 1 is a flowchart showing an entire routine of the control for engaging the starting clutch 3 in the event of restarting the engine 1 under the S & S control. As can be seen from FIG. 1, the control is comprised of three modes for engaging the disengaging starting clutch 3. Therefore, the control mode to be shifted to is determined first of all. To this end, it is determined whether or not the starting clutch (also called the "clutch" in the following explanation) 3 is under control (at step S1). For example, if the starting clutch 3 is disengaged under the S & S control, or if the starting clutch 3 is being engaged gradually when starting the engine 1, the control system determines the fact that the starting clutch 3 is under control so that the answer of step S1 is YES. However; it is unnecessary to control the hydraulic pressure applied to the starting clutch 3 if the starting clutch 3 is engaged completely after a termination of the S & S control. Also, it is unnecessary to apply the hydraulic pressure to the starting clutch 3 if a shift position is in the parking position or in the neutral position. In those cases, therefore, the control system determines that the starting clutch 3 is not under control so that the answer of step S1 will be NO.

If the answer of step S1 is NO, the routine shown in FIG. 1 is ended without carrying out any specific control. By contrast, if the answer of step S1 is YES, a satisfaction of the condition to restart the engine 1 is determined (at step S2). As described, the engine 1 is restarted under the S & S control upon satisfaction of the predetermined restarting condition. In other words, the engine 1 is restarted under the S & S control upon elimination of the predetermined stopping condition of the engine 1. Therefore, at step S2, a satisfaction of the restarting condition of the engine 1 is determined. If the answer of step S2 is YES, the clutch 3 is engaged to restart the engine 1. To this end, the control mode of the clutch 3 is shifted to a steady pressure (or low pressure) standby mode (at step S3). Given that the friction clutch that is engaged by frictionally engaging friction plates is used as the clutch 3, a clearance is created inevitably between the friction plates if the clutch is disengaged. That is, the clutch 3 starts transmitting torque when the clearance between the friction plates is reduced to zero. This means that the torque transmitting capacity of the clutch 3 can be controlled after the clearance between the friction plates is reduced to zero. Therefore, under the steady pressure standby mode, a constant low pressure is applied to the clutch 3 in a manner such that the clearance between the friction plates is maintained substantially to zero. Here, such steady pressure standby control is carried out in the conventional automatic geared transmissions.

Then, it is determined whether or not a complete explosion of fuel is achieved in the engine 1 (at step S4). If the satisfaction of the condition to restart the engine 1 has already been determined so that the answer of step S2 is NO, the routine advances directly to step S4 while skipping step S3 to determine a complete explosion of fuel. Here, a definition of the "complete explosion of fuel" is that the fuel is burnt completely in each cylinder so that the engine 1 is allowed to rotate autonomously. Specifically, the engine 1 is restarted by carrying out a motoring using a starter motor while restarting a fuel supply, and a crankshaft serving as the output shaft of the engine 1 is rotated at a predetermined angle or predetermined times until the complete explosion of fuel is achieved in the engine 1. At step S4, therefore, it is determined whether or not the engine 1 starts rotating autonomously after such transitional state. Specifically, the complete explosion of fuel is determined based on a fact that a number of revolutions of the engine 1 reaches a reference value determined according to a displacement and a type of the engine 1. For example, such reference value of the engine speed is set within a range of 200 rpm to 500 rpm. In addition, during restarting the engine 1, an air-fuel mixture richer than a theoretical air-fuel ratio is delivered to the engine 1.

After the complete explosion of fuel is achieved in the engine 1, the engine speed is increased toward a speed to be achieved in accordance with an opening degree of the accelerator or the throttle valve. Therefore, the clutch 3 is engaged to increase the torque transmitting capacity in accordance with such increase in the engine speed. To this end, the control mode is shifted to "engaging mode" (at step S5). Details of the engaging mode will be explained later.

Under the engaging mode, hydraulic pressure applied to the clutch 3 is increased gradually to increase the torque transmitting capacity Therefore, after step S5, it is determined whether or not an engagement of the clutch 3 is completed (at step S6). If the complete explosion of fuel has already been determined so that the answer of step S4 is NO, the routine advances directly to step S6 while skipping step S5 to determine a completion of engagement of the clutch 3. Here, a definition of the "completion of engagement" is that a difference between rotational speeds of an input (or drive) side member and an output (or driven) side member is eliminated. Therefore, the determination of step S6 can be made by comparing a rotational speed of the input side of the clutch 3, that is, a turbine speed of the torque converter 2 with a rotational speed of the input shaft of the transmission 4.

If the clutch 3 has not yet been engaged completely so that the answer of step S6 is NO, the routine shown in FIG. 1 is returned to repeat the control from step S1. By contrast, if the answer of step S6 is YES, the control mode of the clutch 3 is shifted to "normal mode" (at step S7). Under the normal mode, the restarting of the engine 1 has been completed so that the engine 1 rotates autonomously, and a relation between an air intake of the engine 1 or a load represented by an throttle opening and an output torque converges to a predetermined relation. Therefore, the torque transmitting capacity of the clutch 3 or the hydraulic pressure applied to the clutch 3 is controlled to be a capacity or a pressure obtained based on an output torque of the engine 1 calculated based on an engine load and an engine speed, and a speed ratio (or a torque ratio) of the torque converter 2. The above-explained controls to be carried out under the normal mode is known in the prior art as disclosed e.g., in Japanese Patent Laid-Open No. 11-325232.

Thus, at step S5 of the preferred example, the clutch 3 is controlled in the manner different from the known controls during a period from the complete explosion of fuel in the engine 1 to the completion of engagement of the clutch 3. The control to be carried out at step S5, that is, the control to be carried out under the clutch engaging mode will be explained hereinafter with reference to the flowchart shown in FIG. 2. First of all, it is determined whether or not the control mode of the clutch 3 is shifted to the engaging mode (at step S51). For example, such determination at step S51 can be made by setting a flag at the aforementioned step S5, and determining if the flag is ON.

Figure 2:
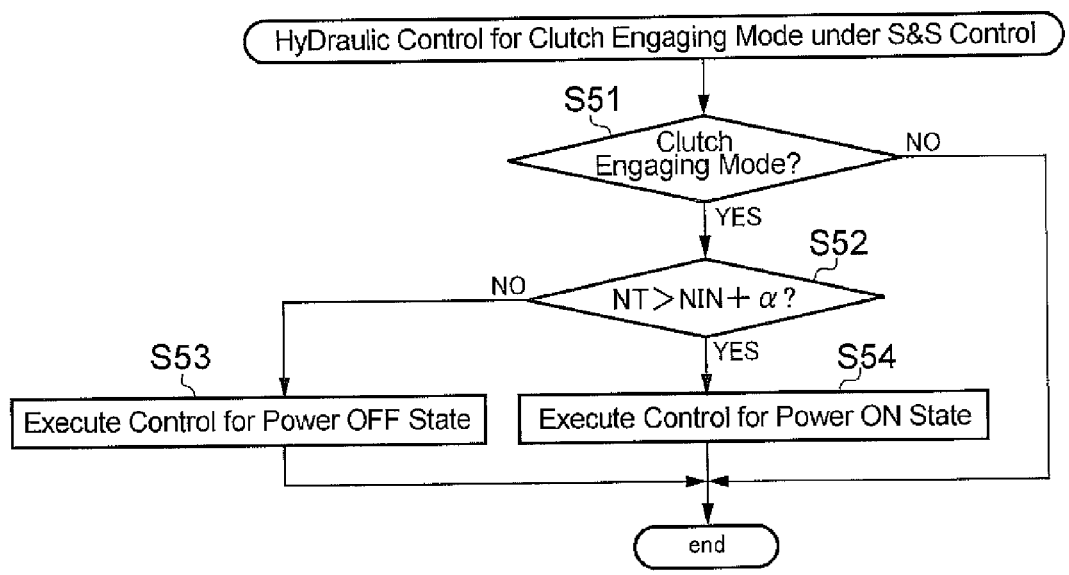
FIG. 2 is a flowchart showing one example of a hydraulic control to be carried out under clutch engaging mode.

If the control mode of the clutch 3 is not shifted to the engaging mode so that the answer of step S51 is NO, the routine shown in FIG. 2 is ended without carrying out any specific control. By contrast, if the control mode of the clutch 3 is shifted to the engaging mode so that the answer of step S51 is YES, it is determined whether or not the vehicle is bought into so-called a "power on" state (step S52). Provided that the vehicle is powered by the engine 1, torque of the engine 1 is transmitted to the input member of the clutch 3 through the torque converter 2, and the torque is further transmitted to the output member of the clutch 3 according to an engagement state of the clutch 3. In this situation, even if the fuel is burnt completely to increase the engine speed so that a turbine speed $N_T$ of the torque converter 2 is increased, the torque transmitting capacity of the clutch 3 has not yet been increased sufficiently in the beginning of the engaging mode. Therefore, a rotational speed of the output member of the clutch 3, that is, a rotational speed $N_{IN}$ of the input shaft of the transmission 4 is still lower than the turbine speed $N_T$ due to a slippage of the clutch 3. Accordingly, such speed difference is determined at step S52. Specifically, at step S52, it is determined whether or not the turbine speed $N_T$ is higher than a rotational speed calculated by adding a predetermined speed $\alpha$ to the rotational speed $N_{IN}$ of the input shaft of the transmission 4 (as will be simply called the "input speed" hereinafter). For this purpose, the predetermined speed $\alpha$ as a threshold value is determined at a design phase to determine a fact that the turbine speed $N_T$ exceeds the input speed $N_{IN}$.

Under the deceleration-based S & S control or the free run S & S control, the engine 1 is stopped in the running vehicle while disengaging the clutch 3. Therefore, after the termination of the S & S control, the turbine 8 is rotated by an inertia force or a drag torque of the clutch 3 at a speed higher than the engine speed $N_E$. That is, in the beginning of the engaging mode, the turbine 8 is rotated by the torque applied from the driving wheels 6 side at a speed lower than the input speed $N_{IN}$. This situation may be categorized into a "power off state" and the control system judges as NO at step S52, and then, a hydraulic control of the clutch 3 for the power off state is carried out (at step S53). Under the power off state, specifically, the hydraulic pressure applied to the clutch 3 is increased according to a predetermined schedule. To this end, so called a "fast fill" is carried out to reduce a clearance between the friction plates of the clutch 3 by temporarily increasing the hydraulic pressure applied to the clutch 3, and duration of the fast fill and pressure to be applied to the clutch 3 are determined in advance. After carrying out the fast fill, the pressure applied to the clutch 3 is increased at a predetermined rate determined in a manner not to cause shocks and not to keep the clutch 3 slipping excessively for a long period of time.

Figure 3:
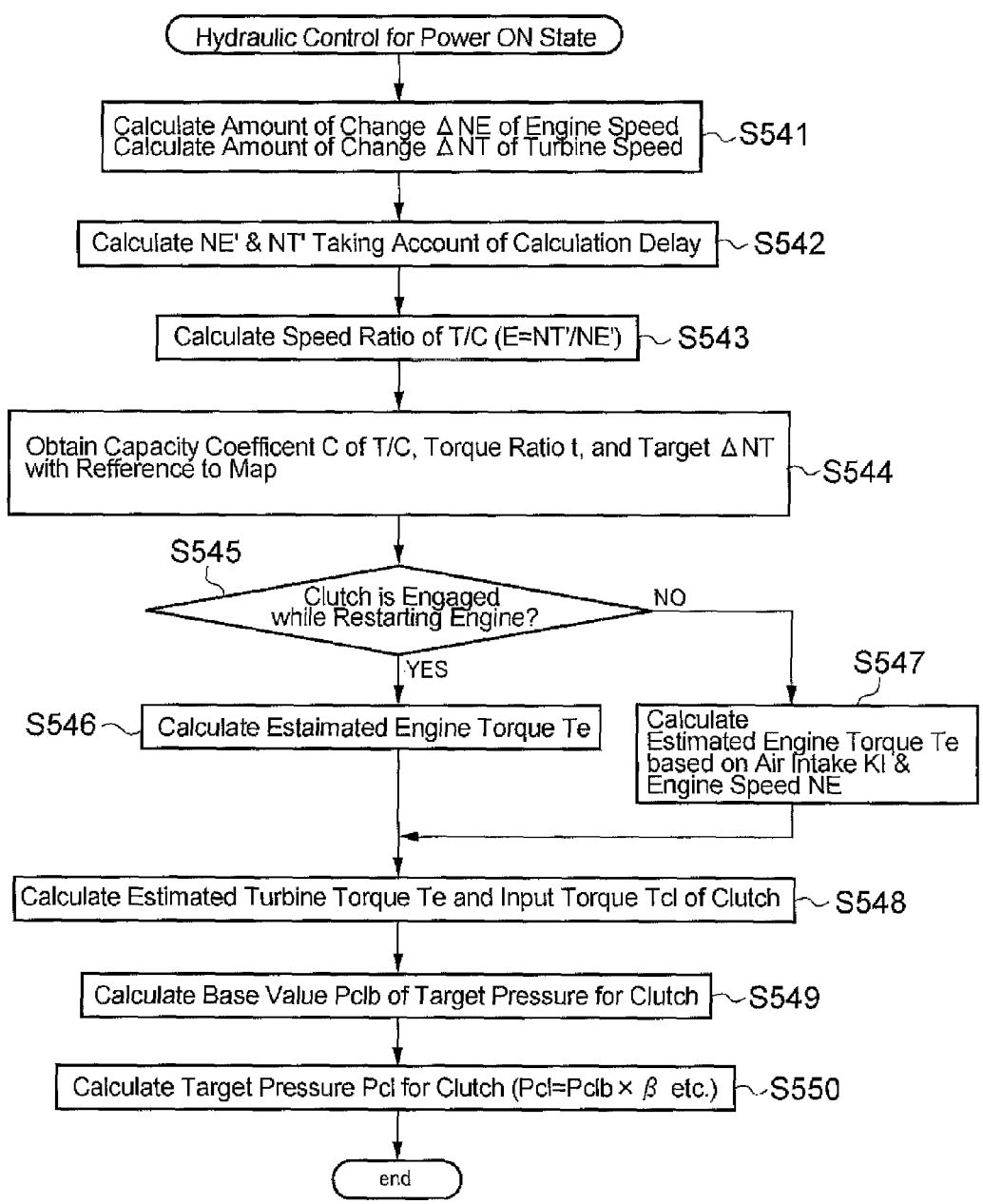
FIG. 3 is a flowchart showing one example of a hydraulic control to be carried out under the power on state of the clutch engaging mode.

After the complete explosion of fuel is achieved in the engine 1 so that the turbine speed $N_T$ is increased with an increase in the engine speed, the clutch 3 and the transmission 4 are powered by the torque of the engine 1. This situation may be categorized into the "power on state" and the control system judges as YES at step S52, and then, a hydraulic control of the clutch 3 for the power on state is carried out (at step S53). Details of the hydraulic control of the clutch 3 to be carried out under the power on state are shown in FIG. 3.

Under the power on state, first of all, an amount of change (or a change rate) $\Delta N_E$ of the engine speed $N_E$ and an amount of change (or a change rate) $\Delta N_T$ of the turbine speed $N_T$ are calculated (at step S541). Those amounts can be calculated by detecting each rotational speed $N_E$ and $N_T$ repeatedly at predetermined intervals, and calculating a difference between a prior detection value and a current detection value, or dividing the calculated value by an elapsed time from a prior detection to a current detection. However, the rotational speeds $N_E$ and $N_T$ are changed over time, and it takes some time to calculate. Therefore, at step S542, an estimated engine speed $N_E'$ and an estimated turbine speed $N_T'$ are individually calculated while taking account of such change in each rotational speed during the calculation, as expressed by the following expressions:

$$N_E' = N_E + K_1 \cdot \Delta N_E$$

$$N_T' = N_T + K_2 \cdot \Delta N_T$$

where $K_1$ and $K_2$ are coefficients of the calculation delay determined depending on a calculator and a program. To this end, the coefficients $K_1$ and $K_2$ are determined in advance based on a result of experimentation or a simulation.

Then, a speed ratio E $(=N_T'/N_E')$ of the torque converter 2 (T/C) is calculated using the estimated values $N_E'$ and $N_T'$ thus calculated (at step S543). A capacity coefficient C representing characteristics of the torque converter 2 and a torque ratio t are changed in accordance with the speed ratio E. Therefore, the capacity coefficient C and the torque ratio t are then determined with reference to a map using the speed ratio E calculated at step S543 as a parameter (a step S544). In addition, a target amount of change (or a target change rate) $\Delta N_{Ttgt}$ of the turbine speed $N_T$ is calculated. Specifically, the target amount of change $\Delta N_{Ttgt}$ is a target value of the turbine speed $N_T$ in the process of engaging the clutch 3 completely until the turbine speed $N_T$ is synchronized with the input speed $N_{IN}$. To this end, the target amount of change $\Delta N_{Ttgt}$ is preinstalled in the form of a map prepared taking account of shocks and a control delay. In the map, specifically, the target amount of change $\Delta N_{Ttgt}$ of the turbine speed $N_T$ is determined using an engine load (i.e., a throttle opening), a vehicle speed and etc. as parameters.

Then, it is determined whether or not the engaging control of the clutch 3 for restarting the engine 1 is to be carried out (at step S545). For example, if the clutch 3 has been disengaged under the S & S control but the condition to restart the engine 1 is satisfied or the condition to carry out the S & S control is eliminated before the engine 1 is stopped, the engaging control of the clutch 3 would be started while driving the engine 1. In other case, the engaging control of the clutch 3 may be carried out while restarting the engine 1 stopped by the S & S control responsive to a satisfaction of the restarting condition. At step S545, therefore, it is determined whether or not the clutch 3 is engaged while restarting the engine 1.

It is possible to reduce the shocks and the control delay by adjusting the torque transmitting capacity of the clutch 3 or the hydraulic pressure for engaging the clutch 3 in accordance with the torque applied to the clutch 3. To this end, it is necessary to obtain an output torque of the engine 1 governing the torque applied to the clutch 3. Therefore, if the engagement control of the clutch 3 will be carried out while restart-ing the engine 3 so that the answer of step S545 is YES, an engine torque $T_e$ is calculated based on (or estimated from) the characteristics of the torque converter 2 (at step S546). Specifically, the engine torque $T_e$ is calculated by multiplying the capacity coefficient C of the torque converter 2 by a square of the engine speed $N_E$, as expressed by the following equation:

$$T_e = C \cdot N_E^2.$$

To the contrary, if the engagement control of the clutch 3 to be carried out is not the control for restarting the engine 3, the answer of step S545 will be NO. In this case, the engine torque $T_e$ is calculated or estimated with reference to a map determining the engine torque $T_e$ using an air intake $K_1$ and the engine speed $N_E$ as parameters (at step S547). In the gasoline engine, there is a predetermined relation among the air intake $K_1$, the engine speed $N_E$ and the engine torque $T_e$ depending on an displacement and a type of the engine, and such relation can be preinstalled in the form of a map based on an experimental result or the like. At step S547, therefore, the engine torque $T_e$ is calculated or estimated with reference to the map thus prepared.

After calculating or estimating the engine torque $T_e$, a torque $T_t$ of the turbine 8 of the torque converter 2 and an input torque $T_{cl}$ of the clutch 3 are calculated (at step S548). At this step, first of all, a calculation is carried out using the engine torque $T_e$ and the torque ratio t calculated at step S544 as expressed by the following expression:

$$T_{tb} = t \cdot T_e.$$

Then, the turbine torque $T_t$ is calculated by applying a first order lag correction to the calculation value $T_{tb}$. The turbine torque $T_t$ will not be applied to the clutch 3 as it is. That is, an inertia torque resulting from a change in a rotational speed of the rotary member of the input side of the clutch 3 (i.e., the torque converter 2 side) will act on the clutch 3. For example, if the rotational speed is being increased, a torque from which the inertia torque is subtracted is applied to the clutch 3. Accordingly, the input torque $T_{cl}$ of the clutch 3 can be expressed as:

$$T_{cl} = T_t - I \cdot \Delta N_{Ttgt}$$

where I is the inertia moment of the rotary members closer to the engine 1 than the clutch 3.

After calculating the input torque $T_{cl}$ applied to the clutch 3 from the torque converter 2 side, a target pressure $P_{cl}$ with respect to the calculated input torque $T_{cl}$ is calculated. To this end, first of all, a base value $P_{clb}$ of the target pressure $P_{cl}$ for the clutch 3 is calculated (at step S549). As described, in the preferred example, the friction clutch is used as the clutch 3. Accordingly, the base value $P_{clb}$ of the target pressure $P_{cl}$ with respect to the input torque $T_{cl}$ can be calculated based on: number of the friction plates $K_{cl}$ of the clutch 3; a friction coefficient $\mu$; an effective radius $R_{cl}$ of the friction plate; a load (or an elastic force) $F_{sp}$ established by a return spring of the clutch 3; and a pressure receiving area $A_{cl}$ of a piston of a hydraulic actuator for the clutch 3, as expressed by the following expression:

$$P_{clb} = \{(T_{cl}/K_{cl}/\mu/R_{cl}) + F_{sp}\}/A_{cl}.$$

Then, the target pressure $P_{cl}$ for the clutch 3 is calculated based on the base value $P_{clb}$ thus calculated (at step S550). At step S550, specifically, the target pressure $P_{cl}$ is calculated by correcting the base value $P_{clb}$ in accordance with an opening degree of the throttle valve, a speed ratio between the input side and the output side of the clutch 3, and so on. For example, in order to reduce a change in the hydraulic pressure, the driving force, or the longitudinal acceleration, the target pressure $P_{cl}$ is calculated by multiplying the base value $P_{clb}$ by a predetermined correction coefficient β, as expressed by the following expression:

$$P_{cl} = P_{clb} \cdot \beta.$$

Instead, in order to raise the target pressure $P_{cl}$ slightly higher than the base value $P_{clb}$, the correction coefficient β may also be added to the base value $P_{clb}$ as expressed by the following expression:

$$P_{cl} = P_{clb} + \beta.$$

For these purposes, the correction coefficient β may be determined in advance with respect to the opening degree of the throttle valve, the speed ratio of the clutch 3 and so on, based on an result of an experimentation or a simulation carried out in a manner to suppress a change in shocks and acceleration at a final phase of the engagement of the clutch 3, or to avoid a delay in the engagement of the clutch 3. More specifically, the correction coefficient β is determined in a manner such that the target pressure $P_{cl}$ is lowered in case the opening degree of the throttle valve and the speed ratio of the clutch 3 are large, in comparison with the case in which the opening degree of the throttle valve and the speed ratio of the clutch 3 are small.

Figure 4:
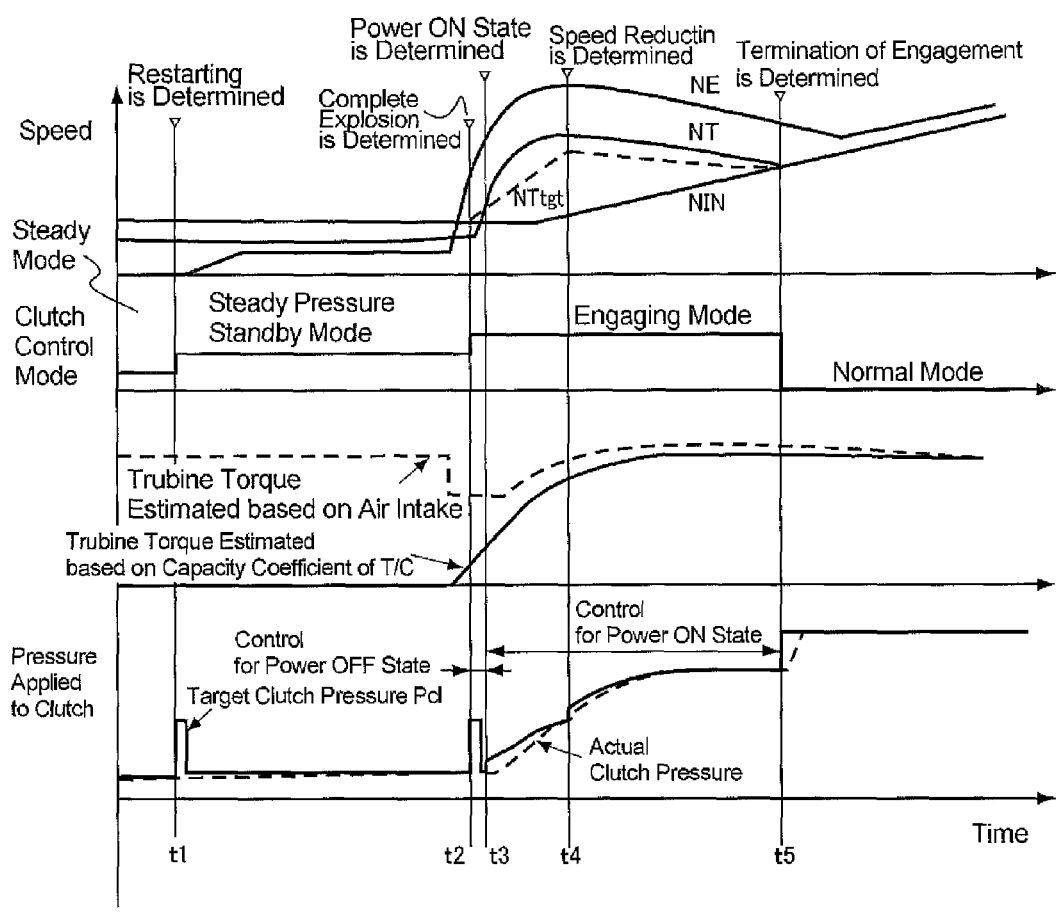
FIG. 4 is a time chart schematically showing changes in rotational speeds and a hydraulic pressure of the clutch under the controls shown in FIGS. 1 to 3.

Referring now to FIG. 4, there are shown changes in the rotational speeds, the turbine torque $T_t$, the target pressure $P_{cl}$ of the clutch 3 and so on. When the determination to restart the engine 1 stopped by the S & S control is made (at point t1), the engine 1 is rotated by the starter motor and the rotational speed of the engine 1 is raised. In this situation, the control mode of the clutch 3 is shifted to the steady pressure standby mode so that the target pressure $P_{cl}$ of the clutch 3 is raised temporarily to execute the fast fill, and the target pressure $P_{cl}$ is then maintained to a low pressure level. Specifically, FIG. 4 shows an example to restart the engine 1 stopped by the S & S control in the vehicle running at a certain speed, therefore, the transmission 4 is rotated by a torque from the driving wheels 6 side at a low speed, that is, the input speed $N_{IN}$ is low. Meanwhile, the turbine 3 is rotated by a drag torque and the turbine speed $N_T$ is lower than the input speed $N_{IN}$, that is, the vehicle is under the power off state.

A combustion in the engine 1 is commenced by carrying out the motoring while delivering (or injecting) the fuel thereto so that the rotational speed of the engine 1 is increased. When the engine speed $N_E$ exceeds the reference speed, the complete combustion of fuel is determined (at point t2). Accordingly, the control mode of the clutch 3 is shifted to the engaging mode at the point t2.

An increase in the rotational speed of the turbine is delayed behind the engine speed $N_E$ due to slippage of the clutch 3. Therefore, the turbine speed $N_T$ is lower than the input speed $N_{IN}$ for a certain period of time after the point t2 at which the complete combustion of fuel was determined. At the point t2, therefore, the negative determination is made at step S52 to carry out the control for the power off state. Specifically, the target pressure $P_{cl}$ of the clutch 3 is raised temporarily to execute the fast fill, and then maintained to a constant low pressure. Thereafter, the target pressure $P_{cl}$ is increased gradually.

During execution of the hydraulic control for the power off state, the turbine speed $N_T$ is increased gradually. On the other hand, the input speed $N_{IN}$ is maintained in accordance with the vehicle speed or the speed ratio of the transmission 4. Therefore, the turbine speed $N_T$ exceeds the input speed $N_{IN}$ in comparatively short time after the complete combustion of fuel in the engine 1. Then, the determination of the power on state is made when a difference between the turbine speed $N_T$ and the input speed $N_{IN}$ exceeds the aforementioned predetermined speed α (at point t3), and the hydraulic control for the power on state explained with reference to FIG. 3 is carried out. Specifically, the turbine torque $T_t$ is estimated (or calculated) based on the capacity coefficient C of the torque converter 2 and the torque ratio t by the procedure explained with reference to FIG. 3. Accordingly, the turbine torque $T_t$ or the estimated value thereof is gradually increased from the point t2. In this situation, the target value $N_{Ttgt}$ of the turbine speed $N_T$ is determined with reference to the map, and the target pressure $P_{cl}$ of the clutch 3 is determined to the value with respect to the estimated value of the turbine torque $T_t$. Consequently, the actual pressure applied to the clutch 3 is increased gradually so that the torque transmitting capacity of the clutch 3 is increased gradually.

Under the hydraulic control of the clutch 3 according to the preferred example, the turbine speed $N_T$ is thus increased gradually in a manner to follow the target value $N_{Ttgt}$ so that the turbine speed $N_T$ is increased and eventually decreased at point t4 in FIG. 4. In this situation, a load torque applied to the engine 1 is increased with an increase in the torque transmitting capacity of the clutch 3 so that the engine speed $N_E$ is also decreased. To the contrary, since the pressure applied to the clutch 3 and the torque transmitting capacity of the clutch 3 are increased, the input speed $N_{IN}$ is increased. Therefore, the target amount of change (or the target change rate) $\Delta N_{Ttgt}$ of the turbine speed $N_T$ is changed in a manner to synchronize the turbine speed $N_T$ with the input speed $N_{IN}$ being increased. In the example shown in FIG. 4, specifically, the change rate is changed from the positive value to the negative value. When the change rate is thus shifted from the positive value to the negative value, the inertia torque is applied to the clutch 3. Therefore, the target pressure $P_{cl}$ of the clutch 3 is increased slightly stepwise, and then the turbine speed $N_T$ is changed gradually to achieve the target value $N_{Ttgt}$ thereof.

The difference between the turbine speed $N_T$ and the input speed $N_{IN}$ is reduced gradually by thus increasing the pressure applied to the clutch 3 and the torque transmitting capacity of the clutch 3, and eventually the turbine speed $N_T$ is synchronized with the input speed $N_{IN}$. At this point, the termination of the engagement of the clutch 3 is determined (at point t5). In this situation, it is possible to change the drive force and the acceleration mildly to reduce shocks by reducing the target pressure $P_a$ of the clutch 3 by the correction coefficient β, as shown in Step S550 in FIG. 3. Then, the hydraulic control mode of the clutch 3 is shifted to the normal mode, and the engine 1 is rotated at the speed deviated from the input speed $N_{IN}$ in accordance with the speed ratio E of the torque converter 2.

According to the control system of the preferred example, when restarting the engine 1, the target pressure $P_{cl}$ of the hydraulic pressure applied to the clutch 3 is controlled based on the engine torque $T_e$ calculated based on the capacity coefficient C and the torque ratio t, until the starting clutch 3 is engaged completely. Therefore, the turbine speed $N_T$ and the engine speed $N_E$ are changed smoothly so that the drive torque is prevented from being changed abruptly and shocks are reduced. In addition, the clutch 3 is not simply caused to slip. This means that the clutch 3 is caused to slip during controlling the pressure applied to the clutch 3 in accordance with the engine torque $T_e$ to synchronize the turbine speed $N_T$ with the input speed $N_{IN}$. Therefore, a period of causing the slippage of the clutch 3 can be shortened as much as possible by adjusting the target value $N_{Ttgt}$ of the turbine speed $N_T$ so that the control delay and deterioration in durability of the clutch 3 can be avoided effectively. In FIG. 4, a broken line represents a turbine torque calculated based on an engine load such as an air intake, without carrying out the foregoing controls of the preferred example. If the turbine torque is calculated based on an engine load and a speed ratio of the torque converter when restarting the engine 1, the turbine torque would be calculated based on an air intake increased to start the engine 1 certainly and a comparatively large speed ratio. Therefore, an estimated value of the turbine torque would be larger than an actual torque. If the torque to be applied to the clutch is controlled based on the larger estimated value, the clutch would be engaged abruptly while causing shocks. However, the control system according to the preferred example can avoid such occurrence of shocks certainly.

Next, another control example to be carried out by the control system of the present invention will be explained hereinafter. As described, the condition to restart engine 1 being stopped under the S & S control is satisfied when the accelerator pedal is depressed and then the starting clutch 3 is engaged. However, if the accelerator pedal is returned during restarting the engine 1 during engaging the clutch 3, the vehicle will be bought into the power off state. In this situation, if the hydraulic pressure applied to the clutch is controlled while estimating the engine torque $T_e$ based on the capacity coefficient C of the torque converter 2, the drive torque may not be reduced thereby producing a drive force different from an operation of the accelerator. In order to avoid such disadvantage, another control example is configured to change contents for controlling the hydraulic pressure applied to the clutch 3 if the accelerator pedal is returned before the clutch 3 is engaged completely.

Figure 5:
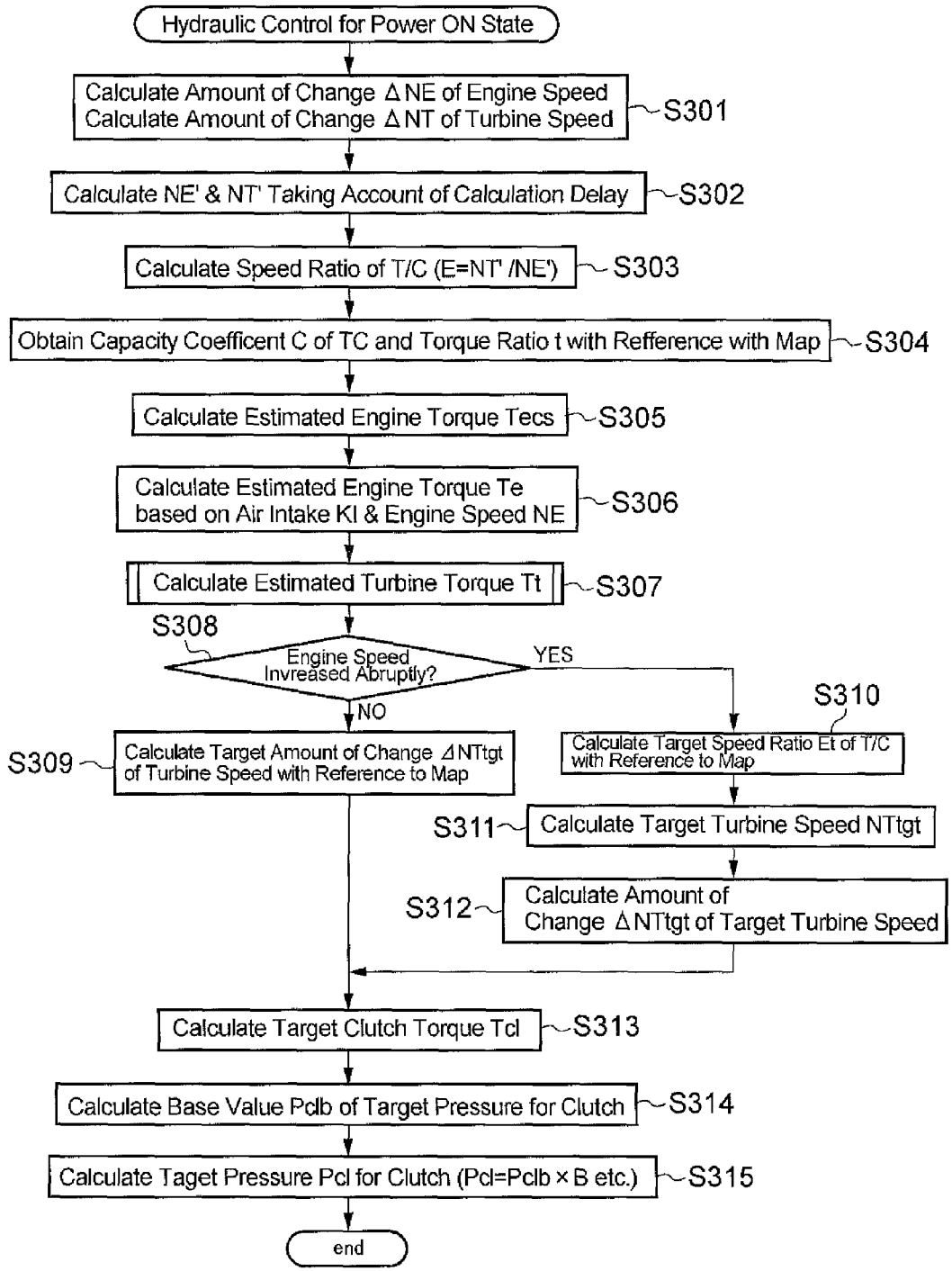
FIG. 5 is a flowchart showing another example of a control carried out by the starting clutch control system of the present invention.

Referring now to FIG. 5, there is shown a flowchart in which the flowchart shown in FIG. 3 is partially modified. According to another example shown in FIG. 5, first of all, an amount of change (or a change rate) $\Delta N_E$ of the engine speed $N_E$ and an amount of change (or a change rate) $\Delta N_T$ of the turbine speed $N_T$ are calculated (at step S301) sequentially, and an estimated engine speed $N_E'$ and an estimated turbine speed $N_T'$ are individually calculated based on the calculated change rates $\Delta N_E$ and $\Delta N_T$ while taking account of calculation delay (at step S302). Then, a speed ratio E of the torque converter 2 (T/C) is calculated using the estimated values $N_E'$ and $N_T'$ thus calculated (at step S303), and a capacity coefficient C and a torque ratio t are then obtained with reference to a map using the speed ratio E calculated at step S303 as a parameter (a step S304). Thus, steps S301 to S304 are similar to steps S541 to S544 shown in FIG. 3.

Then, an estimated engine torque $T_{ecs}$ is calculated based on the capacity coefficient C and the engine speed $N_E$ as expressed by the following expression:

$$T_{ecs} = C \cdot N_E^2$$

as step S546 shown in FIG. 3, (at step S305). While carrying out step S305 or after step S305, an estimated engine torque $T_{ekl}$ is calculated based on an air intake $K_I$ of the engine 1 and the engine speed $N_E$ by the conventional calculation method as step S547 shown in FIG. 3 (at step S306).

Figure 6:
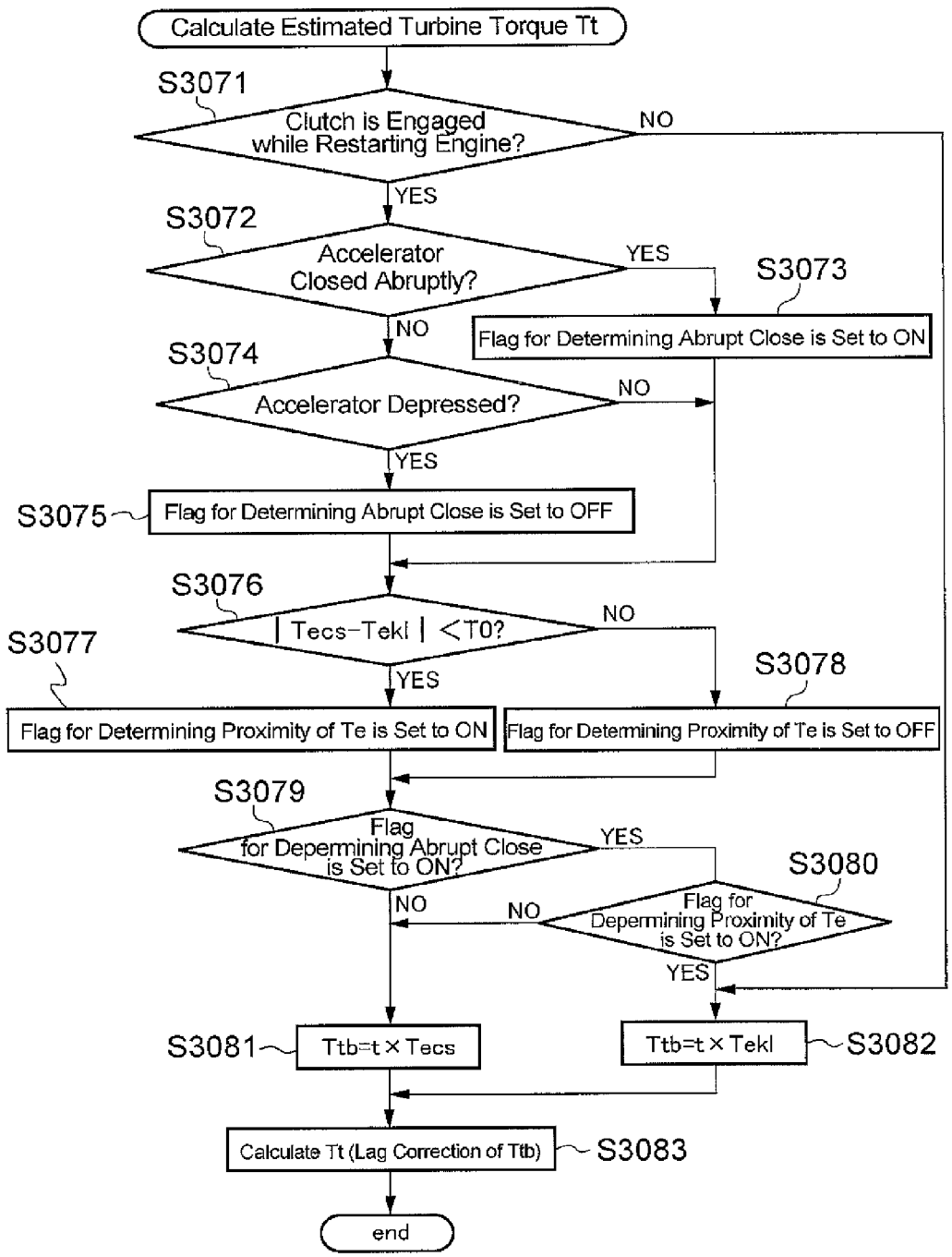
FIG. 6 is a flowchart showing one example of a control for estimating a turbine torque.

Then, an estimated value of the turbine torque $T_t$ is calculated based on those calculation values (at step S307). Details of the control carried out at step S307 are shown in FIG. 6. According to the subroutine carried out at step S307, first of all, it is determined whether or not the engaging control of the clutch 3 for restarting the engine 1 is to be carried out (at step S3071). That is, the determination similar to step S545 shown in FIG. 3 is carried out based on a signal from a not shown controller for the S & S control.

Thereafter, it is determined whether or not the accelerator is closed abruptly (at step S3072). In other words, it is determined whether or not the accelerator pedal is returned abruptly to reduce an opening degree of the accelerator to zero in short time. Such determination can be made based on a signal from an accelerator position censor. If the answer of step S3072 is YES, a flag for determining abrupt closing is set to ON (at step S3073). By contrast, if the answer of step S3072 is NO, it is determined whether or not the accelerator pedal is depressed (at step S3074). If the accelerator pedal is depressed so that the answer of step S3074 is YES, the flag for determining abrupt closing is set to OFF (at step S3075). Then, it is determined whether or not the estimated values $T_{ecs}$ and $T_{ekl}$ of the engine torque are close to each other (at step S3076). If the flag for determining abrupt closing was set to ON at step S3073, or if the accelerator pedal is not depressed so that the answer of step S3074 is NO, the routine advances directly to step S3076 to determine the relation between the estimated values Tecs and Tekl.

The determination of a fact that the estimated values $T_{ecs}$ and $T_{ekl}$ are close to each other can be made by determining an absolute value of a difference between the estimated values $T_{ecs}$ and $T_{ekl}$ is smaller than a predetermined criterion value T0. To this end, the criterion value T0 is determined in a manner such that a variation width of the drive torque falls within an allowable width, even if the estimated value of the engine torque $T_e$ used to control the pressure applied to the clutch is altered from the estimated value $T_{ecs}$ calculated based on the characteristics of the torque converter 2 to the estimated value $T_{ekl}$ calculated based on the air intake. If the estimated values $T_{ecs}$ and $T_{ekl}$ are close to each other so that the answer of step S3076 is YES, a flag for determining proximity of the engine torque $T_e$ is set to ON (at step S3077). By contrast, if the difference between the estimated values $T_{ecs}$ and $T_{ekl}$ is larger than the criterion value T0 so that the answer of step S3076 is NO, the flag for determining proximity of the engine torque Te is set to OFF (at step S3078).

After carrying out any of the controls of steps S3077 and S3078, it is determined whether or not the flag for determining abrupt closing is set to ON (at step S3079). Specifically, if the accelerator pedal was returned abruptly after the commencement of the control to restart the engine 1 so that the flag for determining abrupt closing has been set to ON, the answer of step S3079 will be YES. By contrast, if the accelerator pedal has not been returned abruptly since the commencement of the control to restart the engine 1, the answer of step S3079 will be NO. If the answer of step S3079 is YES, then it is determined whether or not the flag for determining proximity of the engine torque $T_e$ is set to ON (at step S3080).

If the accelerator pedal has not been returned abruptly so that the answer of step S3079 is NO, or if the difference between the estimated values $T_{ecs}$ and $T_{ekl}$ is still large so that the answer of step S3080 is NO, a base value $T_{tb}$ of the turbine torque $T_t$ is calculated by multiplying the estimated value $T_{ecs}$ obtained based on the capacity coefficient C of the torque converter 2 by the torque ratio t (at step S3081). By contrast, if the answer of step S3080 is YES, that is, if the accelerator pedal has been returned abruptly, and the estimated values $T_{ecs}$ and $T_{ekl}$ are close to each other, the base value $T_{tb}$ of the turbine torque $T_t$ is calculated by multiplying the estimated value $T_{ekl}$ obtained based on the air intake $K_I$ by the torque ratio t (at step S3082). Then, the turbine torque $T_t$ is calculated by applying a first order lag correction to the calculated base value $T_{tb}$.

Referring now back to FIG. 5, the estimated value of the turbine torque $T_t$ is calculated by the above-explained procedures at step S307, and then it is determined whether or not the engine speed is increased abruptly so that a difference between an input speed and an output speed of the clutch 3 is widened (at step S308). For example, such determination can be made based on a difference between: a minimum value $N_{Tmin}$ of a difference between the turbine speed $N_T$ and the input speed $N_{IN}$ after shifting the control mode of the hydraulic pressure applied to the clutch 3 to the engaging mode; and a current difference between the turbine speed $N_T$ and the input speed $N_{IN}$. Specifically, the control system determines a fact that the engine speed is increased abruptly given that the difference between the current difference between the turbine speed $N_T$ and the input speed $N_{IN}$ and the minimum value $N_{Tmin}$ is larger than a predetermined value $(((N_T-N_{IN})-(N_T-N_{IN})_{min}) >$ predetermined value). In addition, given that a difference between: a maximum value $N_{Tmax}$ of a difference between the turbine speed $N_T$ and the input speed $N_{IN}$ after shifting the control mode of the hydraulic pressure applied of the clutch 3 to the engaging mode; and a current difference between the turbine speed $N_T$ and the input speed $N_{IN}$; is larger than another predetermined value $(((N_T-N_{IN})_{max}-(N_T-N_{IN})) >$ predetermined value), the control system determines to lower the engine speed.

If the difference between the turbine speed $N_T$ and the input speed $N_{IN}$ is being reduced with the progress of the control of the hydraulic pressure applied of the clutch 3, the answer of step S308 will be NO. In this case, a target amount of change $\Delta N_{Ttgt}$ of the turbine speed $N_T$ is determined with reference to the preinstalled map in which a throttle opening, a vehicle speed and etc. are used as parameters so as to synchronize the turbine speed $N_T$ with the input speed $N_{IN}$ being increased (at step S309). In contrast, under the power on state, an engine torque is transmitted to the clutch 3 under a condition that the pressure applied to the clutch 3 is still low, and the turbine speed $N_T$ and the input speed $N_{IN}$ may be large. Therefore, the answer of step S308 will be YES in the beginning of the control of the hydraulic pressure applied to the clutch 3. In this case, a target speed ratio $E_t$ is determined with reference to a preinstalled map in which a throttle opening, a vehicle speed and etc. are used as parameters (at step S310), and a target turbine speed $N_{Ttgt}(=ET \cdot N_E')$ is calculated based on the calculated target speed ratio $E_t$ and estimated engine speed $N_E'$ calculated at step S302 (at step S311). Then, a target amount of change $\Delta N_{Ttgt}(=N_{Ttgt}-N_T')$ of the turbine speed $N_T$ is calculated based on the target turbine speed $N_{Ttgt}$ and the estimated turbine speed $N_T'$ calculated at step S302 (at step S312).

Thus, the target amount of change $\Delta N_{Ttgt}$ as a factor of generating an inertia torque is calculated at step S309 or S312. Then, at step S313, a target clutch torque $T_{cl}$ is calculated based on the target amount of change $\Delta N_{Ttgt}$ thus calculated, using the following formula also used at step S548 shown in FIG. 3:

$$T_{cl}=T_t-I \cdot \Delta N_{Ttgt}.$$

Then, a target base value $P_{clb}$ of the hydraulic pressure applied to the clutch 3 is calculated based on the target clutch torque $T_{cl}$ (at step S314), and a target pressure $P_{cl}$ is calculated (at step S315). Specifically, the calculations similar to those executed at the aforementioned steps S549 and S550 shown in FIG. 3 are also carried out at steps S314 and S315.

Figure 7:
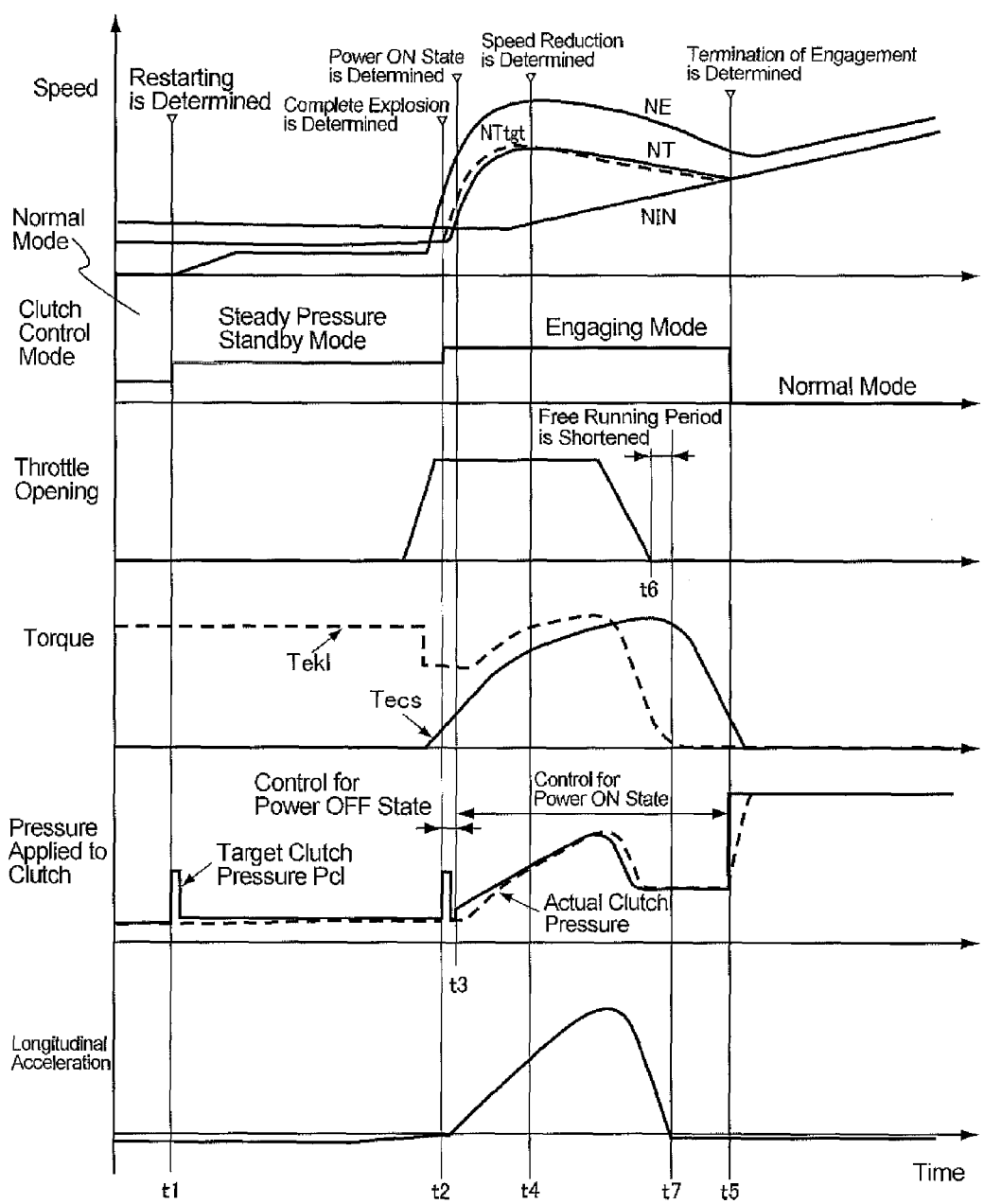
FIG. 7 is a time chart schematically showing changes in the rotational speeds, the hydraulic pressure of the clutch, the opening degree of the accelerator, and the longitudinal acceleration under the controls shown in FIGS. 5 and 6.

Referring now to a time chart of FIG. 7, there are shown changes in the rotational speeds $N_E$ and $N_T$, the hydraulic pressure applied to the clutch, the opening degree of the throttle valve, and the longitudinal acceleration under the controls shown in FIGS. 5 and 6. Specifically, FIG. 7 shows an example in which the brake pedal is returned under the deceleration-based S & S control so that the control to restart the engine 1 is commenced, and then the accelerator pedal is temporarily depressed and immediately returned. When the brake pedal is returned, the determination to restart the engine 1 is made (at point t1), and the control mode of the clutch 3 is shifted to the steady pressure standby mode. In the meantime, the accelerator pedal is depressed so that the vehicle is brought into the power on state, and then, the complete combustion of fuel is determined (at point t2). Then, the determination of the power on state is made (at point t3), and the pressure applied to the clutch 3 is increased gradually and the turbine speed $N_T$ starts lowering so that the determination to lower the engine speed is made (at point t4). The rotational speeds, the torque, and the hydraulic pressure applied to the clutch 3 are changed in a manner similar to those in the example shown in FIG. 4 until the point t4.

Then, when the accelerator pedal is returned abruptly so that the determination of abrupt closing is made, the engine torque value used to control the hydraulic pressure applied to the clutch 3 is shifted from the estimated engine torque $T_{ecs}$ estimated from the capacity coefficient C of the torque converter 2 to the estimated engine torque $T_{ekl}$ estimated from the air intake $K_I$, based on a fact that the estimated engine torque $T_{ecs}$ and the estimated engine torque $T_{ekl}$ are close to each other. The estimated engine torque $T_{ekl}$ is reduced rapidly by returning the accelerator pedal to reduce the opening degree of the throttle valve to zero. Consequently, the hydraulic pressure applied to the clutch 3 is reduced promptly with the reduction in the estimated engine torque $T_{ekl}$ estimated from the air intake $K_I$. As a result, the torque transmitted to the driving wheels 6 is reduced so that the longitudinal acceleration of the vehicle is reduced without delay behind the returning operation of the accelerator pedal. That is, the vehicle is decelerated or allowed to coast. According to the example shown in FIG. 7, the opening degree of the throttle valve is reduced to zero at point t6, and the longitudinal acceleration is immediately reduced to be negative at point t7. Therefore, a period of so-called "free running", that is, a period of producing the longitudinal acceleration after returning the accelerator pedal can be shortened thereby reducing an uncomfortable feeling which may felt by the driver. If the control to deal with the abrupt closing is not carried out, the estimated turbine torque would be changed as indicated by a solid line in FIG. 7. In this case, the estimated turbine torque is reduced to zero after the point t5 at which the determination of termination of the engagement. Therefore, the hydraulic pressure is maintained to a high level to produce the longitudinal acceleration positively. As a result, a period of free running is extended to provide an uncomfortable feeling.

Thus, according to the controls shown in FIGS. 5 and 6, the target turbine speed $N_{Ttgt}$ is calculated based on the engine speed $N_E$ or the estimated value $N_E'$ thereof. Therefore, the target turbine speed $N_{Ttgt}$ is allowed to be changed smoothly before and after the determination to lower the engine speed. For this reason, the hydraulic pressure applied to the clutch will not be changed stepwise so that the drive torque can be prevented from being changed stepwise to cause shocks.

The present invention should not be limited to the foregoing examples. For example, a clutch that is controlled electrically to change a torque transmitting capacity may also be used as the starting clutch instead of the clutch that is controlled hydraulically to change a torque transmitting capacity. In this case, a current applied to the clutch is controlled instead of hydraulic pressure to change the torque transmitting capacity of the clutch.

Thus, the starting clutch control system is applied to a vehicle in which a torque generated by an engine is inputted to a torque converter comprised of a pump impeller and a turbine, and the torque is outputted from the torque converter to driving wheels through a starting clutch, and the foregoing controls are executed by an electronic control unit composed mainly of a microcomputer that is configured to stop the engine while disengaging the starting clutch upon satisfaction of a predetermined condition when the vehicle is running, and to restart the stopping engine while engaging the starting clutch upon satisfaction of a predetermined restarting condition. That is to say, the starting clutch control system is comprised of: a first turbine torque estimating means that estimates a torque of a turbine of the torque converter based on an engine speed, and a capacity coefficient and a torque ratio of the torque converter, when the engine is required to increase a power to be restarted; a torque transmitting capacity increasing means that increases a torque transmitting capacity of the clutch in accordance with the estimated torque of the turbine; and a second turbine torque estimating means that estimates the torque of the turbine based on an air intake of the engine and the engine speed after a completion of an engagement of the clutch.

In addition, the starting clutch control system is configured to control the torque transmitting capacity of the clutch in accordance with the torque of the turbine estimated based on the air intake of the engine and the engine speed instead of the torque estimated based on the engine speed, and the capacity coefficient and the torque ratio of the torque converter, if a demand to increase the engine power is eliminated during increasing the torque transmitting capacity of the clutch.

The invention claimed is:

1. A starting clutch control system applied to a vehicle in which a torque generated by an engine is inputted to a torque converter, the torque converter including a pump impeller and a turbine, the torque being outputted from the torque converter to a plurality of driving wheels through a starting clutch, the starting clutch control system being configured to stop the engine while disengaging the starting clutch upon satisfaction of a predetermined condition when the vehicle is running, and to restart the stopping engine while engaging the starting clutch upon satisfaction of a predetermined restarting condition, the starting clutch control system comprising:
    an electronic control unit configured to:
        estimate a first torque of the turbine of the torque converter based on: (i) an engine speed, (ii) a capacity coefficient, and (iii) a torque ratio of the torque converter, the first torque being estimated when the engine is required to increase a power to be restarted;
        increase a torque transmitting capacity of the clutch in accordance with the estimated first torque of the turbine;
        estimate a second torque of the turbine based on: (i) an air intake of the engine, and (ii) the engine speed, the second torque being estimated after a completion of an engagement of the clutch; and
        control the torque transmitting capacity of the clutch in accordance with the estimated second torque of the turbine.

2. The starting clutch control system as claimed in claim 1, wherein if a demand to increase the engine power is eliminated during increasing the torque transmitting capacity of the clutch, the electronic control unit is further configured to control the torque transmitting capacity of the clutch in accordance with the second torque of the turbine estimated based on the an air intake of the engine and the engine speed, instead of the first torque of the turbine estimated based on the engine speed, the capacity coefficient, and the torque ratio of the torque converter.

3. The starting clutch control system as claimed in claim 2, wherein if a difference between the estimated first torque and the estimated second torque is smaller than a predetermined value, a torque of the turbine to be used to control the torque transmitting capacity of the clutch is switched from the first torque of the turbine estimated based on the engine speed, the capacity coefficient, and the torque ratio of the torque converter, to the second torque of the turbine estimated based on the an air intake of the engine speed.

4. The starting clutch control system as claimed in claim 1, wherein
    the clutch includes a friction clutch, a torque transmitting capacity of the friction clutch is increased by increasing hydraulic pressure applied to the friction clutch; and
    the hydraulic pressure applied to the friction clutch is corrected in accordance with an opening degree of a throttle valve of the vehicle or a speed ratio of the clutch.

5. The starting clutch control system as claimed in claim 4, wherein the correction of the hydraulic pressure applied to the friction clutch includes a correction to lower the hydraulic pressure in case the opening degree of the throttle valve or the speed ratio is large, in comparison with a case in which the opening degree of the throttle valve or the speed ratio is small.

6. The starting clutch control system as claimed in claim 1, wherein
    the engine includes an internal combustion engine; and
    the electronic control unit is further configured to:
        estimate the first torque of the turbine of the torque converter based on the engine speed, capacity coefficient, and the torque ratio of the torque converter, after a complete explosion of fuel is achieved in the restarted engine; and
        increase the torque transmitting capacity of the clutch in accordance with the estimated first torque of the turbine.

7. The starting clutch control system as claimed in claim 1, wherein a demand to increase the engine power includes an augmentation of an opening degree of an accelerator or a throttle valve.

* * * * *